US008731355B2

(12) United States Patent
Xu et al.

(10) Patent No.: US 8,731,355 B2
(45) Date of Patent: May 20, 2014

(54) OPTICAL LOGIC DEVICE

(75) Inventors: Qianfan Xu, Mountain View, CA (US); Michal Lipson, Ithaca, NY (US)

(73) Assignee: Cornell University, Ithaca, NY (US)

( * ) Notice: Subject to any disclaimer, the term of this patent is extended or adjusted under 35 U.S.C. 154(b) by 1222 days.

(21) Appl. No.: 12/438,720

(22) PCT Filed: Aug. 24, 2007

(86) PCT No.: PCT/US2007/018845
§ 371 (c)(1),
(2), (4) Date: Sep. 9, 2010

(87) PCT Pub. No.: WO2008/024512
PCT Pub. Date: Feb. 28, 2008

(65) Prior Publication Data
US 2010/0328744 A1    Dec. 30, 2010

Related U.S. Application Data

(60) Provisional application No. 60/839,970, filed on Aug. 24, 2006.

(51) Int. Cl.
G02B 6/12         (2006.01)
G02B 6/00         (2006.01)
G02B 6/293        (2006.01)

(52) U.S. Cl.
CPC ........ *G02B 6/29335* (2013.01); *G02B 6/29338* (2013.01)
USPC ............................... 385/122; 385/14; 385/32

(58) Field of Classification Search
CPC ........... G02B 6/29335; G02B 6/29338; G02B 6/29343
See application file for complete search history.

(56) References Cited

U.S. PATENT DOCUMENTS

| 4,632,518 A | 12/1986 | Jensen |
| 5,446,579 A | 8/1995 | Lomashevitch |
| 8,295,655 B2 * | 10/2012 | Manipatruni et al. ............ 385/3 |
| 2003/0123780 A1 | 7/2003 | Fischer |

(Continued)

FOREIGN PATENT DOCUMENTS

| WO | WO-2008/024512 | 2/2008 |
| WO | WO-2008024512 A2 | 2/2008 |

OTHER PUBLICATIONS

Ibrahim et al., "All-Optical AND/NAND Logic Gates Using Semiconductor Microresonators", IEEE Photonics Technology Letters, vol. 15, No. 10, Oct. 2003, pp. 1422-1424.*
Grover et al., "III-V Semidoncutor Optical Micro-Ring Resonators", AIP Conference Proceedings, 2004, vol. 709, Issue 1, pp. 110-129.*

(Continued)

*Primary Examiner* — Michelle R Connelly
(74) *Attorney, Agent, or Firm* — Perkins Coie LLP

(57) ABSTRACT

An all optical logic circuit includes a micro-ring resonator (110) optically coupled to a waveguide (115) The waveguide (115) provides multiple optical input signals (INPUT A, INPUT B) and an optical probe signal (PROBE) at a different frequency (lambda s) than the optical input signals (INPUT A, INPUT B) to the micro-ring resonator (110) such that the probe signal (PROBE) exhibits logical amplitude transitions as a function of the multiple input signals (INPUT A, INPUT B) The logical amplitude transitions of the optical probe signal (PROBE) correlate to an ANDing or NANDing of the optical input signals (INPUT A, INPUT B) In one embodiment, the all optical logic circuit is an integrated silicon device.

22 Claims, 8 Drawing Sheets

(56) References Cited

U.S. PATENT DOCUMENTS

| | | |
|---|---|---|
| 2006/0023997 A1 | 2/2006 | Almeida et al. |
| 2006/0215949 A1 | 9/2006 | Lipson et al. |
| 2009/0067773 A1* | 3/2009 | Krug et al. ............... 385/9 |

OTHER PUBLICATIONS

"International Application Serial No. PCT/US2007/018845, Search Report mailed Jul. 16, 2008", p. 220, 8pgs.

"International Application Serial No. PCT/US2007/018845, Written Opinion mailed Jul. 16, 2008", p. 237, 5pgs.

* cited by examiner

OPTICAL LOGIC DEVICE

RELATED APPLICATIONS

This application is a nationalization under 35 U.S.C. 371 of PCT/US2007/018845, filed Aug. 24, 2007 and published as WO 2008/024512 A2 on Feb. 28, 2008, which claimed priority under 35 U.S.C. 119(e) to U.S. Provisional Patent Application Ser. No. 60/839,970, filed Aug. 24, 2006; which applications and publication are incorporated herein by reference and made a part hereof.

GOVERNMENT FUNDING

This invention was made with Government support under Grant Number F49620-1-0424 awarded by Air Force Office of Scientific Research and NSF career award. The United States Government has certain rights in the invention.

BACKGROUND

Logical devices are well known in the semiconductor arts. Various electrical circuits have been used to take one or more electrical input signals and provide an output signal that has a level representative of a logical combination of the one or more input signals. An AND logical device may be used to take two or more input signals and provide an output signal that is a logical "1" only if all of the input signals are also representative of a logical "1". A logical "1" may correspond to a high voltage, and a logical "0" may correspond to a low voltage.

There is a desire to provide such logic functions using optical signals as opposed to electrical signals. It is desired to provide such functions using compact optical devices.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

An all-optical logic device with a micron-size silicon ring resonator utilizes a free-carrier dispersion effect in silicon. Logical AND and NAND operations may be provided at 310 Mbps with higher than 10 dB extinction ratio. A free-carrier-lifetime-limited bit-rate can be significantly improved by active carrier extraction in some embodiments.

Highly developed micro-fabrication technology enables ultra-compact optical devices integrated on silicon. All-optical logic operation is obtained using an integrated silicon device.

Figure 1:
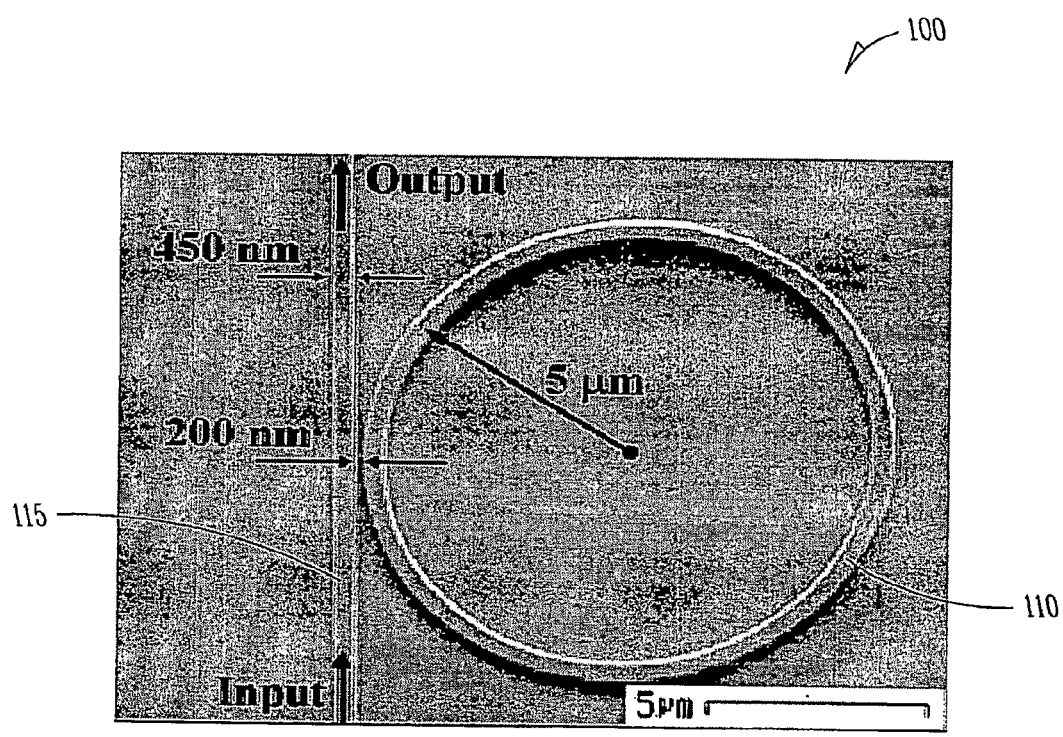
FIG. 1 is a top view of a silicon ring resonator that provides logic functions according to an example embodiment.

In one embodiment shown in a top view generally at 100 in FIG. 1, a silicon micro-ring resonator 110 is coupled to a straight waveguide 115. The resonator and waveguide may be fabricated on a SOI substrate using E-beam lithography, plasma dry etching, and plasma enhanced chemical vapor deposition (PECVD) for SiO2 cladding deposition. The silicon waveguides forming the resonator 110 and waveguide 115 in one embodiment have a width of approximately 450 nm and height of approximately 250 nm. The radius of the ring 110 in one embodiment is approximately R=5 μm, and the spacing between the ring and the straight waveguide is approximately 150 nm. A fiber-to-fiber insertion loss for a quasi-TE mode (electric field parallel to the substrate) is measured to be 10.4 dB in one embodiment. The view of device 100 is prior to the $SiO_2$ cladding deposition.

Figure 2:
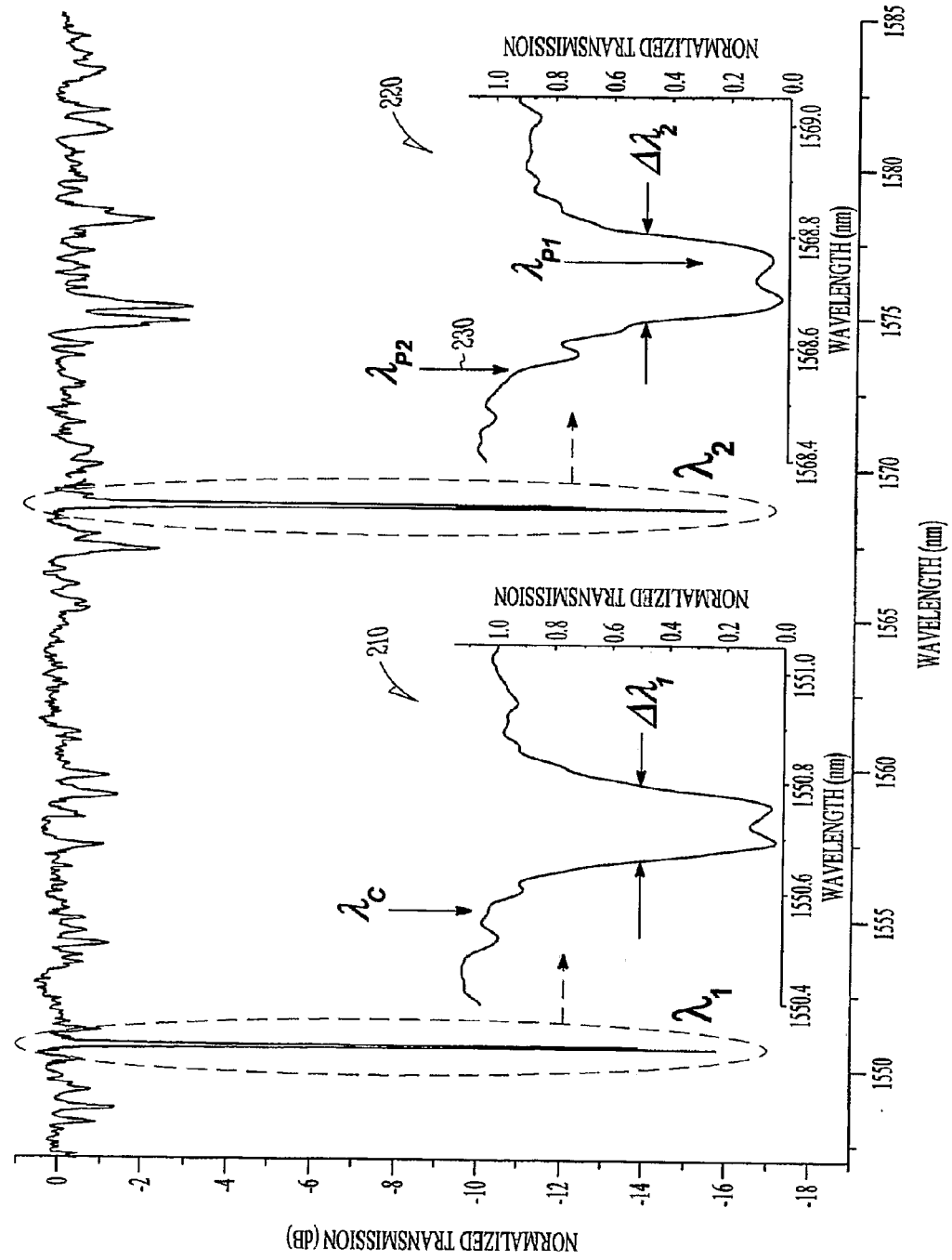
FIG. 2 illustrates resonant wavelengths for the ring resonator of FIG. 1.

A transmission spectrum for the quasi-TE mode is shown in FIG. 2. Two resonances exist at the wavelengths λ1=1550.7 nm and λ2=1568.7 nm respectively. The transmission of the waveguide drops by about 16 dB at both resonances. The insets 210 and 220 of FIG. 2 show a zoom-in spectra around both resonant wavelengths. A full-width-half-maximal (FWHM) bandwidths of the resonances are approximately Δλ1=0.14 nm and Δλ2=0.16 nm, corresponding to Q1=11,076 and Q2=9,804, respectively. The wavelengths of the pump ($\lambda_C$) and the probes for AND ($\lambda_{P1}$) and NAND ($\lambda_{P2}$) gates are marked in the insets.

The weak split of resonances, represented by the double-notch feature of the resonant spectrum, may be caused by a weak reflection inside the ring resonator 110. The photon lifetime of the ring resonator at λ1-resonance can be obtained from Q as τcav1=Q·λ/(2πc)=9.1 ps. This lifetime gives what may be a fundamental limit to the operation speed of the device. In practice, the operating speed of a fabricated device is limited by the longer carrier lifetime.

The logic operation is based on an all-optical modulation mechanism in silicon micro-ring resonator. When a strong optical control pulse or input signal and a weak cw probe light are coupled into the ring resonator through two different resonances, the control pulse generates free carriers in the ring resonator due to the two-photon absorption (TPA) effect. The generated free carriers reduce the refractive index of silicon through a plasma dispersion effect, and blue shifts the ring resonances. The probe light is therefore modulated by the resonance shift. After the control pulse leaves, the resonant wavelength and the transmission of the probe light relax back due to the fast surface recombination of the free carriers. The relaxation time is determined by the carrier lifetime of approximately 0.5 ns in the ring resonator 110.

Figure 3:
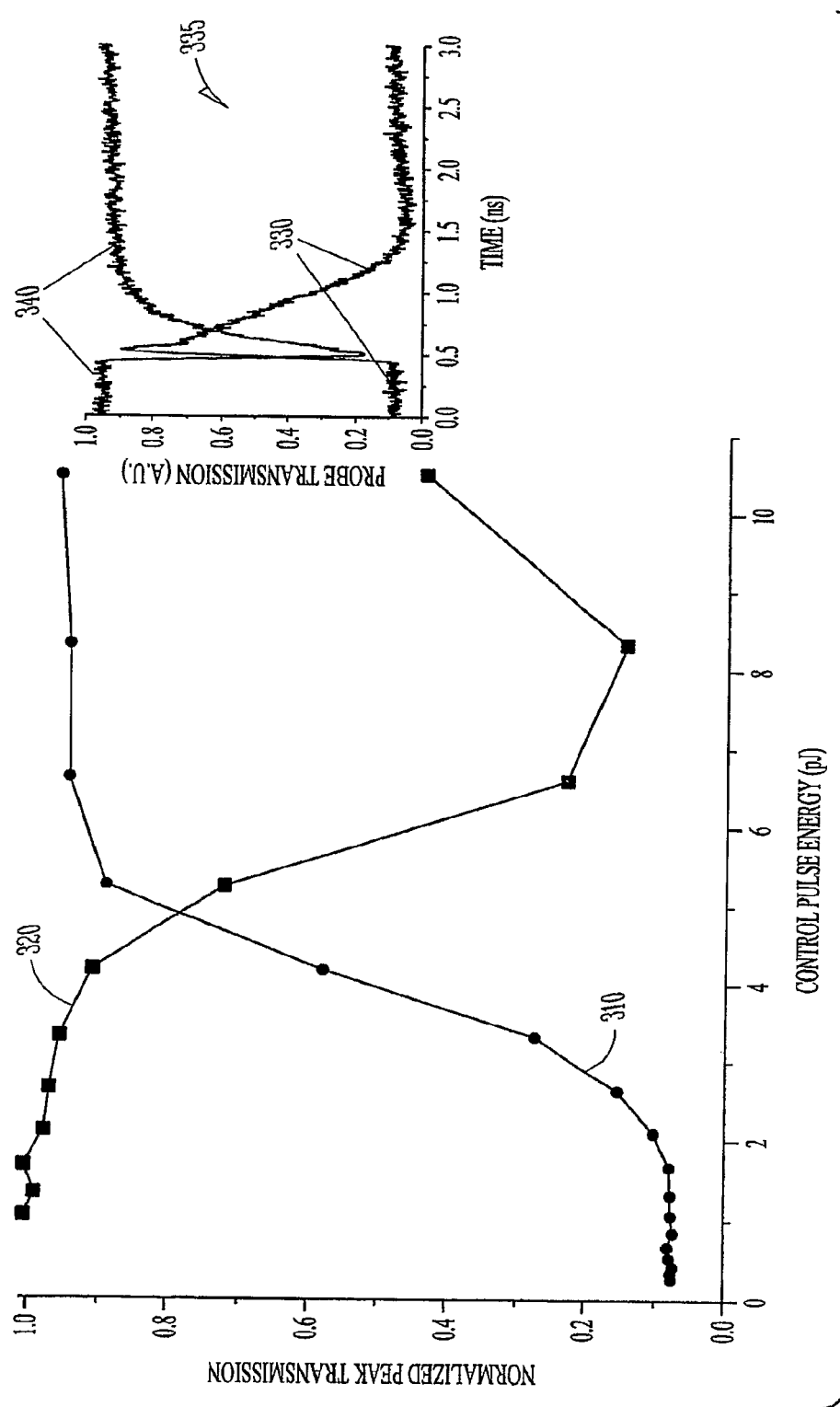
FIG. 3 illustrates a transfer function for all-optical pulse modulation of the ring resonator of FIG. 1.

To show the relationship between the modulation depth and the energy of the control pulse, the transfer functions of the all-optical modulation process is illustrated in FIG. 3 for both the positive modulation, line 310 and negative modulation, line 320, cases, using a 14-ps long Gaussian pulse as the control pulse. A positive modulation is obtained if the wavelength of the probe light is at $\lambda_{P1}$ illustrated in FIG. 2, so that the device has low transmission without the control pulse, as line 330 in the inset 335 of FIG. 3 shows. A negative modulation, shown as line 340 in the inset 335, is obtained at the probe wavelength of $\lambda_{P2}$ with high transmission before the control pulse comes.

Due to the nonlinear nature of this TPA-based process, there is a clear threshold energy the control pulse has to pass to obtain large modulations. A logic-gate-like behavior is obtained on both transfer functions with a sharp transition region sandwiched between flat regions. Specifically, there is a 10-dB increase of modulation depth on the positive-modulation transfer function when the control pulse energy increased from 2.6 pJ to 5.2 pJ. Similarly, there is a 10-dB increase of modulation depth on the negative-modulation transfer function when the control pulse energy increased from 4.1 pJ to 8.2 pJ. Therefore, with properly chosen control pulse energy, dramatically different modulations may be obtained with two control pulses together compared to with only one control pulse, enabling logic operations of AND and NAND gates.

Figure 4:
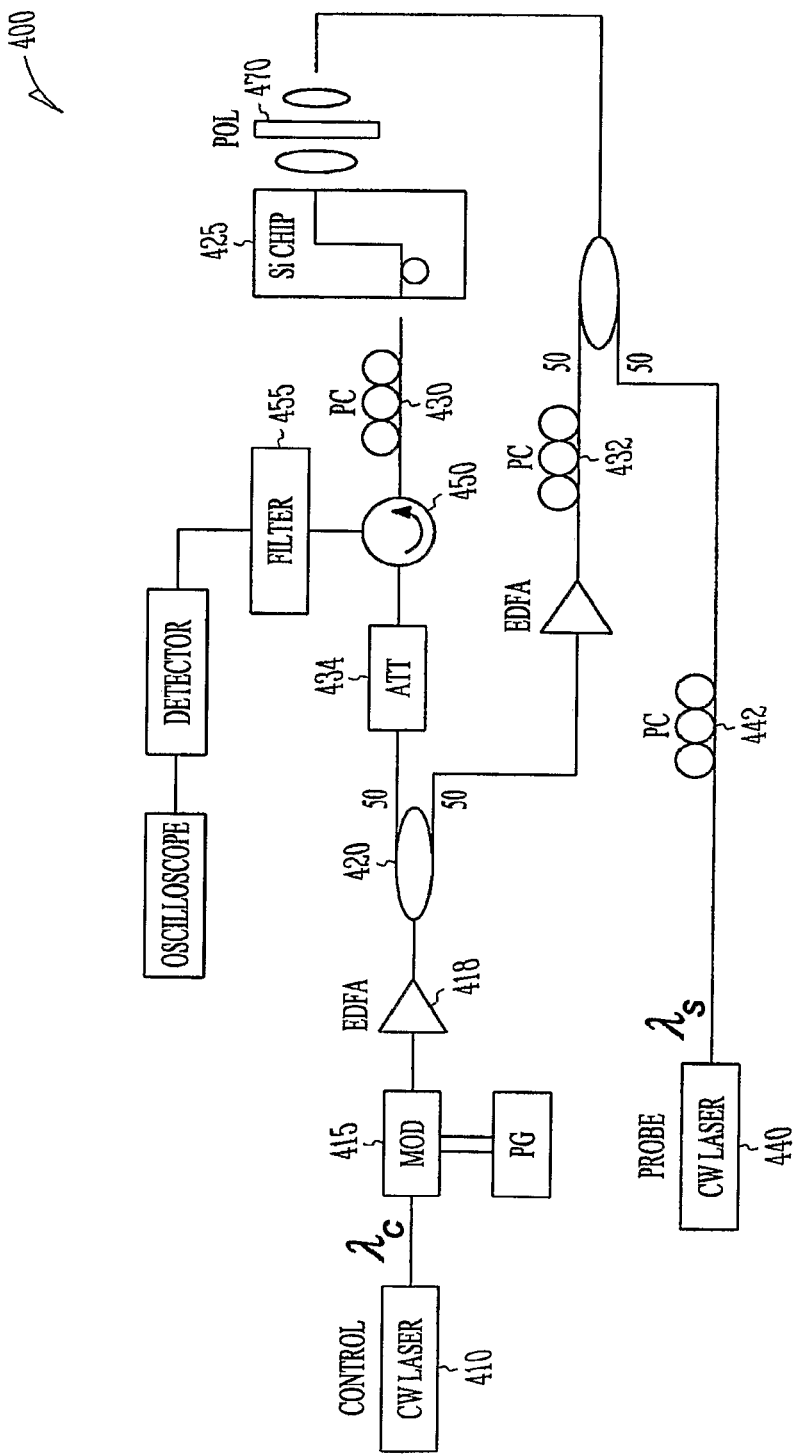
FIG. 4 is a block schematic diagram of an experimental setup for all optical logic utilizing the ring resonator of FIG. 1.

An experimental setup to demonstrate all-optical logic is shown in FIG. 4 at 400. A cw light from tunable laser 410 is modulated at 415 with a PRBS 27-1 return-to-zero (RZ) signal, which is amplified such as by an erbium-doped fiber amplifier (EDFA) 418 and split into two at splitter 420 and sent into a resonator device 425 from two opposite directions via polarization controllers (PC) 430 and 432 to avoid interference between them. One of the control signals may also be attenuated at 434. The wavelength of the control light in one embodiment is fixed at the shorter-wavelength edge of a resonance of the ring resonator, as shown by an arrow 230 in FIG. 2. A cw probe light from a laser 440 tuned at another resonance of the ring resonator, indicated at 240 in FIG. 2, is polarized at 442 and coupled together with one of the control signals at 445 and sent into the device 425. The output of the probe light is separated from the control light using an optical circulator 450 and an optical filter 455. The waveforms of the probe light are then detected at 460 and observed on an oscilloscope 465. The polarization of both control and probe light are set to be TE-like by the polarization controllers 430, 432 and 442. A polarizer 470 may also be used to provide the combined control signal and probe to the device 425.

Figure 5:
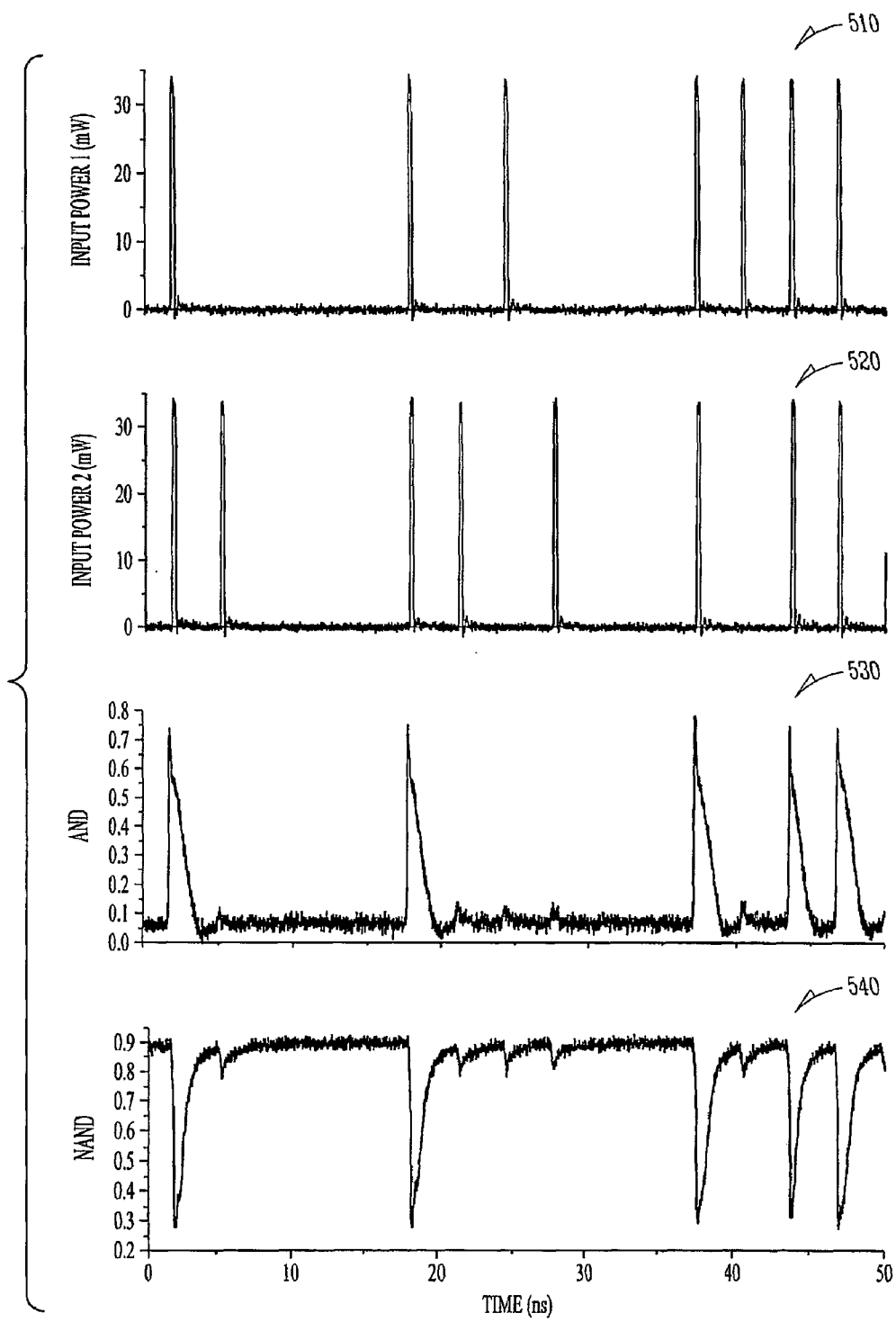
FIG. 5 illustrates waveforms of control signals and output as a logic function of a control signal according to an example embodiment.

In one embodiment, the two control signals have bit-rates of 310 Mbit/s and pulse widths of 200 ps. The average optical power of each control signal is about 2 mW. The waveforms of these two control signal synchronized at the device are show at 510 and 520 in FIG. 5. When both control signal are in logic '1', which means two control pulses are coupled into the ring resonator simultaneously, the total optical power is higher than the threshold to obtain large modulation, and a positive or negative modulation is imposed onto the probe light depending on the wavelength of the probe light. When one or both of the control signals are '0', the total optical power is less than the threshold, and very little modulation is observed on the probe output. This results in the AND ($\lambda$Probe=$\lambda$P1) and NAND ($\lambda$Probe=$\lambda$P2) operations with extinction ration ~10 dB, as evident from 530 and 540 respectively.

Figure 6:
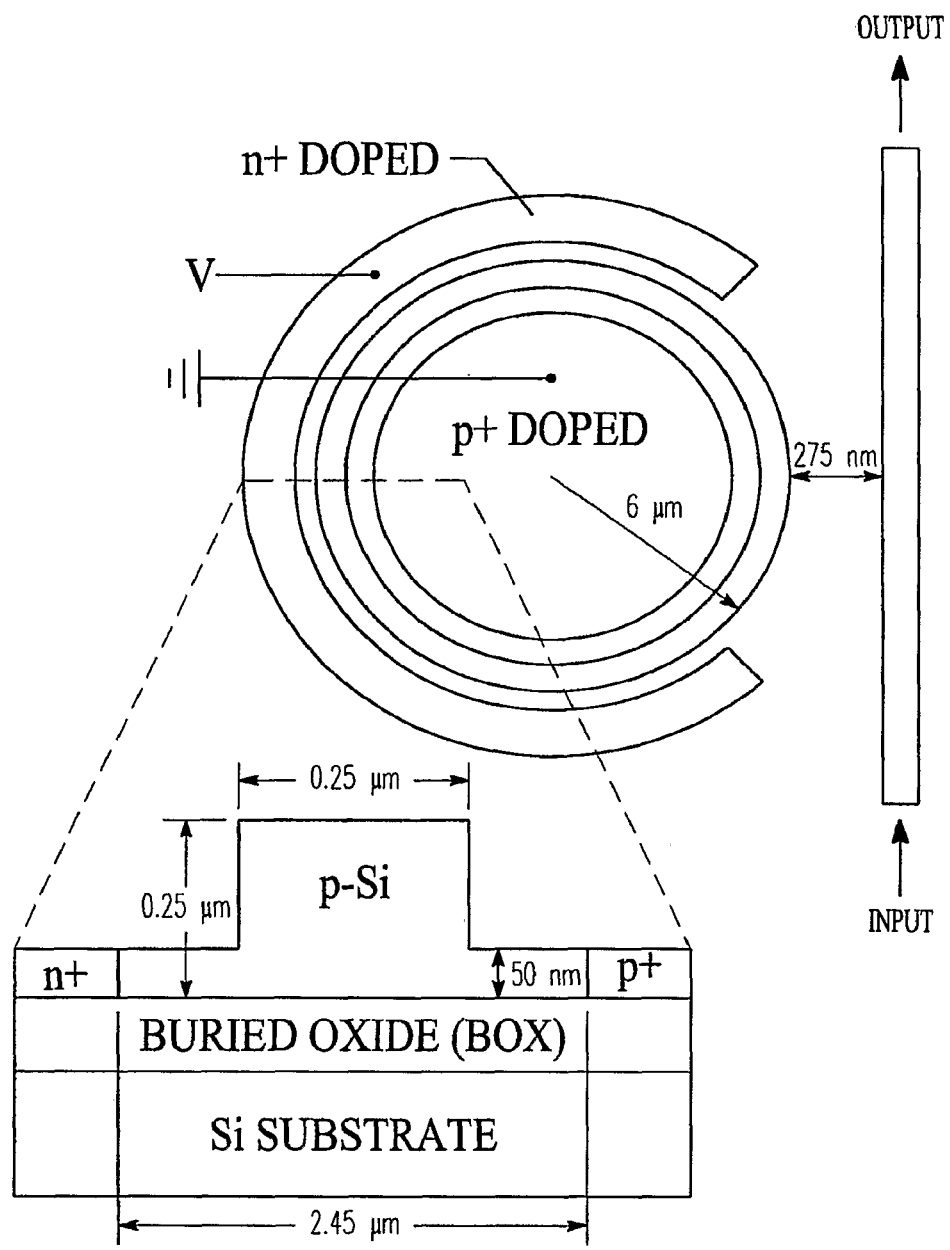
FIG. 6 is a ring resonator with an integrated PIN junction according to an example embodiment.

The bit-rate may be limited by the free-carrier lifetime in the resonator. In order to avoid inter-symbol interference, a second control pulse may come in after all the carriers generated by the first control pulse have recombined. To increase the speed, one can be actively extracting the carriers from the ring resonator, instead of waiting for the carriers in the ring to recombine at the $Si/SiO_2$ interfaces. Carrier lifetime can be reduced to ~30 ps by reversely biasing a p-i-n junction built across or integrated with the ring resonator, enabling logic operation at ~5 Gbit/s as shown in FIG. 6.

Figure 7:
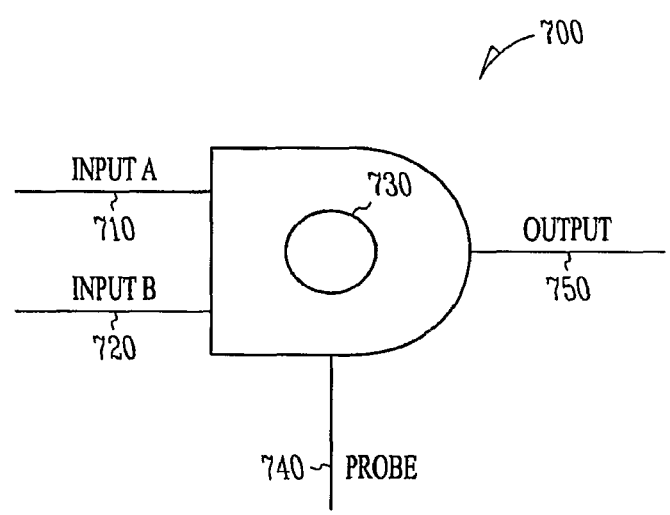
FIG. 7 is a logical block diagram of an optical logic AND device according to an example embodiment.

In further embodiments, the control pulses may be generated from other logic optical devices as shown in FIG. 7 generally at an optical AND or NAND device 700. A first optical input A control signal at 710 and a second optical input B control signal at 720 may be provided to a ring resonator 730. The input signal control pulses may be provided from independent sources as opposed to a single split laser pulse in the experimental setup. A control probe 740 is also provided to the resonator 730. The control signals and probe may be provided on the same waveguide coupling to the resonator, or may be provided on separate waveguides. Similarly, an output signal 750 may be provided on a separate or same waveguide.

The power levels of the control pulses may be adjusted, and more than two control pulses or input signals may be combined to pass a threshold for logically modeling the probe signal. The term micro-ring resonator is used to describe micron or smaller ring type resonators. The size and other parameters of the ring resonators, such as refractive index may be modified to obtain different desired resonant characteristics. In further embodiments, the probe signal obtained from the resonator may be amplified and fed into further logical optical circuitry, either tuned to treat the probe signal as an input signal to be combined with other probe signals and provide yet a further probe signal output responsive to the input probe signals, or to use the probe signal as another probe signal to be modulated by further input signals. In still further embodiments, the frequency and power level of the probe output signal may be modified to that of an input signal.

Figure 8:
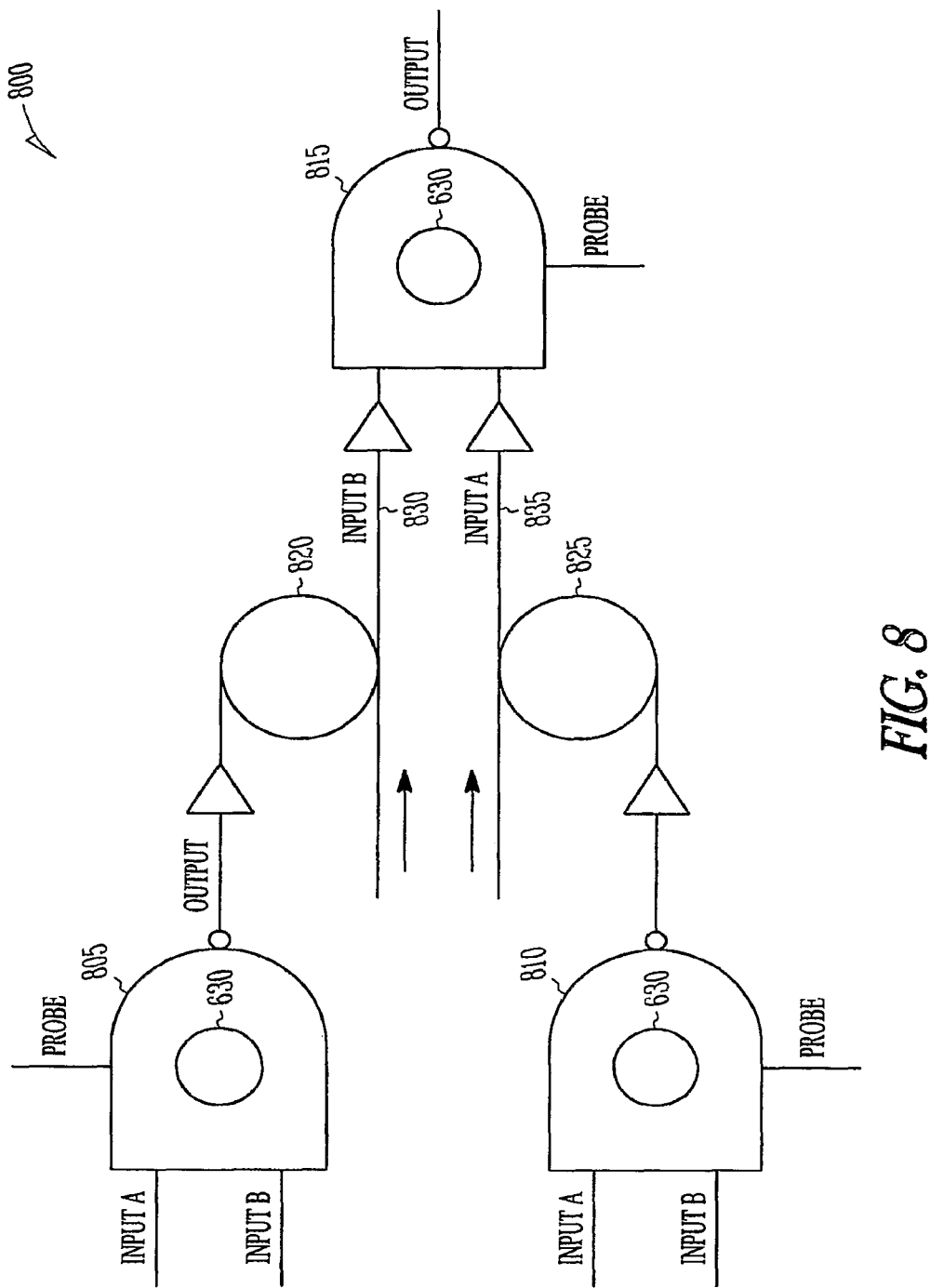
FIG. 8 is a logical block diagram illustrating multiple NAND devices for implementing various logic devices according to an example embodiment.

A NAND gate, such as one incorporating a ring resonator as described herein, has the property of functional completeness. Any other logic function, such as a AND, OR, NOR, etc, can be implemented using NAND gates. An entire processor may be created using NAND gates. In one embodiment shown in FIG. 8 at 800, several logical devices 805, 810 and 815 may be coupled together to provide further logical functions. Each of the devices may be a NAND gate in one embodiment. Outputs from gates 805 and 810 are provided to respective optical switches 820, 825 which operate to control a pair of inputs 830, 835 to gate 815. In one embodiment, the outputs of gates 805 and 810 are amplified such as by EDFAs, and control the optical switch to modulate the input signals 830 and 835 to gate 815 at desired times. Inputs 830 and 835 may also be amplified to proper levels to function as control signals for logic gate 815. In one embodiment, the all-optical switch has the same two resonant frequencies as the NAND gate, and the output probe has a power level that is over the threshold intensity for full modulation of the input signal. If the output is high, the all-optical switch lets a new input signal pass into the next NAND gate, and if it was low, no input signal would pass (or vice versa). Several more NAND gates may be cascaded in this manner to provide a multitude of logical functions.

In various embodiments of all optical logic devices, the output of one all-optical logic device may be used as an input for a second all-optical device. The input to both all-optical logic devices has the same wavelength in one embodiment. A third all-optical logic device may be used as a converter, and the two inputs to such converter have the same wavelength as the probes and outputs of the first and second all-optical logic devices, and the wavelength of the probe and hence the output of the converter is the same as that of the input to the first and second all-optical logic devices.

In one embodiment, the coupling between the probe and the resonator of the converter is such that when the inputs to the converter are zero, the output from the converter is low or zero. In this embodiment, the output from the first all-optical logic devices provides a first input to the converter. A second input, which can be constant, at the same frequency is provided to the converter from another source such that the power of the second input alone is sufficiently below the threshold to achieve deep modulation of the converter's probe signal that little or none of the probe passes through the resonator and there is hence no output. However, when the first input is high, the sum of the first and second inputs to the converter exceeds the modulation threshold, and the probe signal passes through the resonator into the output waveguide, thereby providing an input to the second all-optical logic device at the proper input wavelength.

In another embodiment, the coupling between the probe and resonator of the converter is such that the probe signal passes through the resonator unmodulated when the inputs are zero, and the converter operates to convert a low output from the first all-optical logic devices into a high input to the second all-optical logic devices, or to convert a high output from the first all-optical logic devices into a low input to the second all-optical logic devices.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. An optical logic circuit comprising:
    a semiconductor substrate;
    a micro-ring resonator formed on the substrate, wherein the micro-ring resonator has a first and a second resonance wavelengths;
    multiple light sources that generate multiple optical input signals and an optical probe signal, wherein the multiple optical input signals have wavelengths set at the shorter-wavelength edge of the first resonance wavelength and the optical probe signal has a wavelength that is at approximately the second resonance wavelength;
    a waveguide optically coupled to the micro-ring resonator, the waveguide providing the multiple optical input signals to the micro-ring resonator as multiple inputs to an optical logic gate and the optical probe signal to the micro-ring resonator such that the probe signal exhibits logical amplitude transitions as a function of the multiple input signals to represent the output of the optical logic gate.

2. The optical logic circuit of claim 1 wherein the logical amplitude transitions of the optical probe signal correlate to an ANDing or NANDing of the optical input signals.

3. The optical logic circuit of claim 1 wherein the all optical logic circuit comprises an integrated silicon device.

4. The optical logic circuit of claim 1 wherein the optical input signals generate free carriers that modulate the optical probe signal.

5. The optical logic circuit of claim 4 wherein the power of the optical input signals is controlled such that a threshold for modulation is passed when the optical input signals are combined.

6. The optical logic circuit of claim 1 and further comprising a PIN junction integrated with the micro-ring resonator.

7. The optical logic circuit of claim 6 wherein the PIN junction is reverse biased.

8. An all optical logic circuit comprising:
    a resonator including a semiconductor junction structure that exhibits two optical resonances at first and second different resonance wavelengths and an optical modulation at the first resonance wavelength due to carriers in semiconductor junction structure caused by optical absorption at the second resonance wavelength;
    a mechanism for controlling recombination of carriers at the semiconductor junction structure to increase a response speed of the optical modulation at the semiconductor junction;
    a waveguide optically coupled to the resonator, the waveguide providing multiple optical input signals at the shorter-wavelength edge of the second resonance wavelength to the resonator as multiple inputs to an optical logic gate and an optical probe signal at the first resonance wavelength to the resonator such that the probe signal exhibits logical amplitude transitions as a function of the multiple input signals to represent the output of the optical logic gate; and
    a filter to separate out the probe signal from the optical input signals to provide an output signal.

9. The optical logic circuit of claim 8 wherein the logical amplitude transitions of the optical probe signal correlate to an ANDing or NANDing of the optical input signals.

10. The optical logic circuit of claim 8 wherein the resonator is a micro-ring resonator.

11. The optical logic circuit of claim 10 wherein the micro-ring resonator includes a silicon-on-insulator waveguide ring and a semiconductor p-i-n junction.

12. The optical logic circuit of claim 11 wherein the optical input signals generate free carriers that modulate the optical probe signal.

13. The optical logic circuit of claim 12 wherein the power of the optical input signals is controlled such that a threshold for modulation is passed when the optical input signals are combined.

14. An optical logic circuit comprising:
    a micro-ring resonator including a semiconductor junction responsive to light produce carriers and a carrier control mechanism that reduces, wherein the micro-ring resonator has a first and a second resonance wavelengths;
    means for providing multiple optical input signals in form of optical pulses to the micro-ring resonator as multiple inputs to an optical logic gate and an optical probe signal in form of CW light to the micro-ring resonator such that the probe signal exhibits logical amplitude transitions as a function of the multiple input signals to represent the output of the optical logic gate, wherein the multiple optical input signals have wavelengths set at the shorter-wavelength edge of the first resonance wavelength and the optical probe signal has a wavelength that is set at approximately the second resonance wavelength; and
    a carrier extraction mechanism coupled to the semiconductor junction to actively extract carriers out of the semiconductor junction between logic operations effectuated by the optical pulses of the multiple optical input signals to increase a response time of the optical logic circuit.

15. The optical logic circuit of claim 14 wherein the means for providing is at least one waveguide optically coupled to the micro-ring resonator.

16. The optical logic circuit of claim 14 wherein the means for providing further includes polarization controllers that provide signals to the resonator in a quasi-TE mode.

17. A method of forming logic gates out of optical components, the method comprising:
    optically coupling a plurality of optical NAND gate circuits to one another to form a logic circuit by directing optical output of one optical NAND gate circuit to another, and within each optical NAND gate circuit:
optically coupling a resonator to a waveguide, wherein the resonator has a first and a second resonance wavelengths;
providing two optical control signals to be logically combined to the waveguide, wherein the wavelengths of the two optical control signals are set at the shorter-wavelength edge of the first resonance wavelength;
providing an optical probe signal on the waveguide at the second resonance wavelength, such that the optical probe is logically modulated as a function of the two optical control signals.

18. The method of claim 17 and further comprising a biasing an PIN junction integrated with the resonator to extract free carriers from the resonator between two different logic operations.

19. The method of claim 17 wherein the modulation of the optical probe signal correlate to an ANDing or NANDing of the optical input signals.

20. The method of claim 17 wherein the resonator has a first and a second resonance and wherein the multiple optical input signals have frequencies at or about the first resonance and the optical probe signal has a frequency that is at approximately the second resonance.

21. The method of claim 20 wherein the optical input signals generate free carriers that modulate the optical probe signal.

22. The method of claim 21 wherein the power of the optical input signals is controlled such that a threshold for modulation is passed when the optical input signals are combined.

* * * * *